US010460327B2

(12) United States Patent
Stefik et al.

(10) Patent No.: US 10,460,327 B2
(45) Date of Patent: Oct. 29, 2019

(54) SYSTEMS AND METHODS FOR PERSISTENT CONTEXT-AWARE GUIDES

(75) Inventors: Mark J. Stefik, Portola Valley, CA (US); Stuart K. Card, Los Altos, CA (US); Ed H. Chi, Palo Alto, CA (US); Lichan Hong, Mountain View, CA (US); Barbara Stefik, Portola Valley, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 2978 days.

(21) Appl. No.: 11/495,426

(22) Filed: Jul. 28, 2006

(65) Prior Publication Data

US 2008/0027707 A1    Jan. 31, 2008

(51) Int. Cl.
*G06Q 30/00* (2012.01)
*G06Q 30/02* (2012.01)
*G06F 16/951* (2019.01)

(52) U.S. Cl.
CPC .......... *G06Q 30/02* (2013.01); *G06F 16/951* (2019.01)

(58) Field of Classification Search
USPC .......... 705/14.49–14.67, 14.49–14.56, 14.54
See application file for complete search history.

(56) References Cited

U.S. PATENT DOCUMENTS

| | | | | |
|---|---|---|---|---|
| 5,708,825 | A * | 1/1998 | Sotomayor | 715/205 |
| 6,154,757 | A * | 11/2000 | Krause et al. | 715/205 |
| 7,562,397 | B1 * | 7/2009 | Mithal | G06Q 30/0235 |
| | | | | 705/52 |
| 2001/0023412 | A1 * | 9/2001 | Morimoto | G06Q 30/06 |
| | | | | 705/26.8 |

(Continued)

OTHER PUBLICATIONS

Chris Olston, Ed H. Chi. ScentTrails: Integrating Browsing and Searching on the Web. ACM Transactions on Computer-Human Interaction, vol. 10, Part 3, pp. 177-197. Sep. 2003. ACM Press.

(Continued)

*Primary Examiner* — Eric R Netzloff
*Assistant Examiner* — Christopher Stroud
(74) *Attorney, Agent, or Firm* — Shun Yao; Park, Vaughan, Fleming & Dowler LLP (57) ABSTRACT

Techniques are described that provide a reading pane for reading one or more content portions of a work and a guide pane that displays a structured overview of additional information from the corpus that is focused by an analysis of information from the currently-visible content portion of the work. The contents of the currently-visible content portion displayed within the reading page are used to derive dynamic representations of the user's immediate interests. At the user's request, a structured persistent context-aware guide is computed and displayed. The persistent context-aware guide provides a framework for accessing other parts of the corpus having the most-related information. The elements in the persistent context-aware guide are other content portions or other organizations such as sections, chapters, or articles in the corpus. The persistent context-aware guide may also incorporate additional closely-related information elements from outside the corpus including advertisements. Advertisements for information on the topics of immediate interest to the user can be incorporated within the structured, context-aware guide so that the reader can purchase them and review that information in the context of the current session. The guide pane and the reading pane support navigation controls so that the user can go to new or previous sub-portions of the content portion, new or previous content portions and/or new or previous persistent context-aware guides.

23 Claims, 11 Drawing Sheets

(56) References Cited

U.S. PATENT DOCUMENTS

| | | | |
|---|---|---|---|
| 2002/0069223 A1* | 6/2002 | Goodisman | G06F 17/30867 715/201 |
| 2002/0143940 A1* | 10/2002 | Chi | G06F 17/30864 709/225 |
| 2003/0156141 A1 | 8/2003 | Good et al. | |
| 2006/0053099 A1 | 3/2006 | Gardner et al. | |
| 2006/0074833 A1 | 4/2006 | Gardner et al. | |
| 2006/0074836 A1 | 4/2006 | Gardner et al. | |
| 2007/0118526 A1* | 5/2007 | Gifford et al. | 707/9 |

OTHER PUBLICATIONS

Ed H. Chi, Lichan Hong, Michelle Gumbrecht, Stuart K. Card. ScentHighlights: highlighting conceptually-related sentences during reading. In Proc. of the 10th International Conference on Intelligent User Interfaces, pp. 272-274. ACM Press, Jan. 2005. San Diego, CA.

Ed H. Chi, Lichan Hong, Julie Heiser, Stuart K. Card. eBooks with Indexes that Reorganize Conceptually. In Proc. of the Human Factors in Computing Systems Conference (CHI2004) Conference Companion, pp. 1223-1226. ACM Press, 2004. Vienna, Austria.

Ed H. Chi, Peter Pirolli, Kim Chen, James Pitkow. Using Information Scent to Model User Information Needs and Actions on the Web. In Proc. of ACM CHI 2001 Conference on Human Factors in 490-497. ACM Press, Apr. 2001. Seattle, WA.

Monika Henzinger, Bay-Wei Chang, Brian Milch, and Sergey Brin. (2003) Query-Free News Search. World Wide Web:Monika Henzinger, Bay-Wei Chang, Brian Milch, Sergey Brin, Query-Free News Search, WWW 2003, ACM Press, May 20-24, 2003.

Google, "Google Features Description—Google Gadgets and SideBar", downloaded from http://desktop.google.com/features.html#gadgets on or about Apr. 15, 2007.

* cited by examiner

On a bleak island in the Aral Sea, one hundred monkeys are tethered to posts set in parallel rows stretching out towards the horizon. A muffled thud breaks the stillness. Far in the distance, a small metal sphere lifts into the sky, then hurtles downward, rotating until it shatters in a second explosion.

Some seventy-five feet above the ground, a cloud the color of dark mustard begins to unfurl, gently dissolving as it glides down towards the monkey. They pull at their chains and begin to cry. Some bury their heads between their legs. A few cover their mouths or noses, but it is too late; they have already begun to die.

At the other end of the island, a handful of men in \*\* biological protective suits observe the scene through binoculars, taking notes. In a few hours, they will retrieve the still-breathing monkeys and return them to cages where the \*animals will be under continuous examination for the next several days until, one by one, they die of \*anthrax or \*tularemia, \*Q-fever, \*brucellosis, \*glanders or \*plague.

On a bleak island in the Aral Sea, one hundred monkeys are tethered to posts set in parallel rows stretching out towards the horizon. A muffled thud breaks the stillness. Far in the distance, a small metal sphere lifts into the sky then hurtles downward, rotating until it shatters in a second explosion.

Some seventy-five feet above the ground, a cloud the color of dark mustard begins to unfurl, gently dissolving as it glides down towards the monkey. They pull at their chains and begin to cry. Some bury their heads between their legs. A few cover their mouths or noses, but it is too late; they have already begun to die.

At the other end of the island, a handful of men in ** biological protective suits observe the scene through binoculars, taking notes, in a few hours, they will retrieve the still-breathing monkeys and return them to cages where the *animals will be under continuous examination for the next several days until, one by one, they die of *anthrax or *tularemia, *Q-fever, *brucellosis, *glanders or *plague.

SYSTEMS AND METHODS FOR PERSISTENT CONTEXT-AWARE GUIDES

BACKGROUND OF THE INVENTION

Field of Invention

This invention relates to information access.

Description of Related Art

Foraging for related information is unnecessarily difficult for a user. In conventional search engines, a user must compose a query. However, it may take a user several iterations to compose a query—submitting first queries and looking at results. This is because the user does not already know exactly what he seeks and does not know exactly what is available. Furthermore, on a small, mobile device, query text entry can be awkward and time-consuming.

Also, the main source of revenue for conventional search engines is through advertisements. Conventional search engines have a limited opportunity to present a user with sponsored links or targeted advertisements. They mainly present advertisements when users look at a search page. Once a user clicks on a results link, however, the advertisements disappear because the user's browser loads the information from the linked page.

Some conventional systems based on information scent accept a search term and an index and compute a smaller index based on the most-closely-related words in the larger index. The scent index provides a source of possible information targets, a way of picking a most-closely-related subset of a particular size, and a means for displaying the results. However, conventional information scent index systems do not compute queries from context.

Conventional browsers like Mozilla FireFox sometimes provide a facility for highlighting a portion of the text from a web page and then requesting that a search be performed using a search service, such as Google. The string of characters from the highlighted text is used as a query. The browser then brings up a page of search results. However, these conventional browsers do not perform analysis of the content. The highlighted text is simply taken as a search string. Moreover, the search returns a conventional list of ranked pages and lacks a persistent overview.

In Query Free News Search, Monika Henzinger, Bay-Wei Chang, Brian Milch, Sergey Brin, Query-Free News Search, WWW 2003, May 20-24, 2003, Henzinger describes query free search of news information. This conventional system finds news articles on the web that are relevant to news currently being broadcast. The query is computed from the closed caption of the news story and the information targets are computed from a collection of online news stories.

The Google Desktop Sidebar is an example of a conventional query-free retrieval system. The Google Sidebar attempts to show mini-displays of information that may be relevant to the user. For example, if a user tends to look at certain kinds of news stories, the Google system displays links to new stories on that topic. This conventional system also shows web clips, photos, hot news, local weather, and so on. However, the user interest profile is built-up over successive queries over time. Thus, the displayed information may not be as relevant to current information foraging activities.

Conventional online advertising systems use text analysis for placing advertisements on web pages—as in the placement of banner ads and side ads by companies such as Google® and Yahoo!®. These conventional systems analyze the content of a current web page and then add banner or side bar advertisements for products related to the content of the web page. However, these conventional technologies select advertisements and sponsored links based on the user's query and a keyword auction, rather than an analysis of related materials of interest.

SUMMARY

Techniques are described that provide a reading pane for reading one or more content portions of a work and a guide pane that displays a structured overview of additional information from the corpus that is focused by an analysis of information from the currently-visible content portion of the work. The contents of the currently-visible content portion displayed within the reading page are used to derive dynamic representations of the user's immediate interests. At the user's request, a structured persistent context-aware guide is computed and displayed. The persistent context-aware guide provides a framework for accessing other parts of the corpus having the most-related information. The elements in the persistent context-aware guide refer or point to other content portions or other organizations such as sections, chapters, or articles in the corpus. The persistent context-aware guide may also incorporate additional closely-related information elements from outside the corpus including advertisements. The guide pane and the reading pane support navigation controls so that the user can go to new or previous sub-portions of the content portion, new or previous content portions and/or new or previous persistent context-aware guides.

BRIEF DESCRIPTION OF THE DRAWINGS

FIG. 9 shows a sixth exemplary persistent context-aware guide according to an aspect of this invention;

DETAILED DESCRIPTION OF EXEMPLARY EMBODIMENTS

Figure 1:
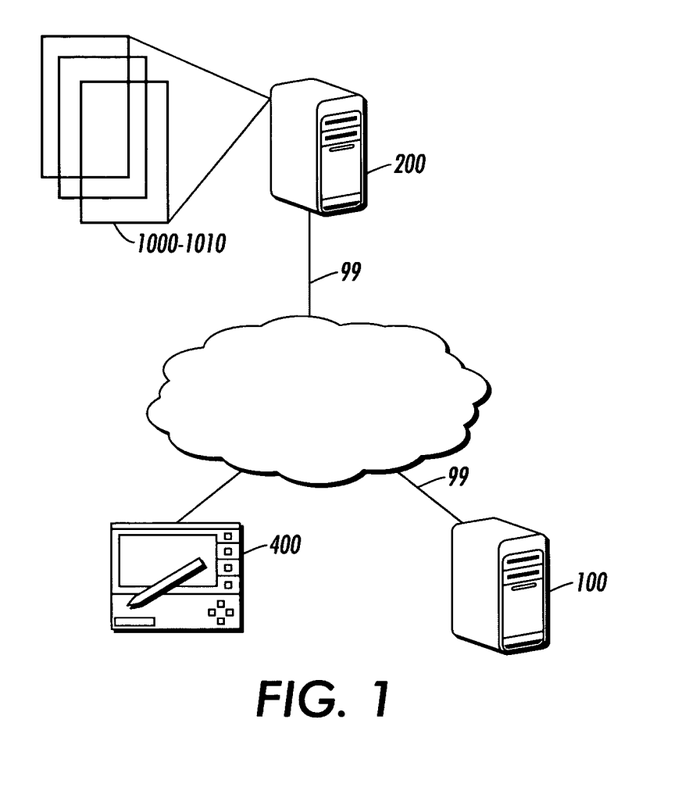
FIG. 1 shows an overview of an exemplary system for persistent context-aware guides according to an aspect of this invention.

FIG. 1 shows an overview of an exemplary system for persistent context-aware guides 100 according to an aspect of this invention. The system for persistent context-aware guides 100 is connected via communications links 99 to: a smartphone 400; and to an information repository 200 providing access to a corpus of documents 1000-1010.

In one exemplary embodiment according to this invention, a user of the smartphone 400 requests a document 1001 from the information repository 200. The request is transferred over the communications links 99 to the system for persistent context-aware guides 100. The system for persistent context-aware guides 100 mediates access to the information repository 200. The system for persistent context-aware guides 100 retrieves the document 1001 and determines the user interest information based on the content items. That is, user interest information is determined by analyzing the document in the reading pane. The user can further focus the selection of information by selecting or highlighting sections of the document or content-portion displayed in the reading pane. The content items may include, but are not limited to, topic information, extracted entities, words, sentences, and the like.

One or more sets of index items within the corpus are determined. The corpus index items may include, but are not limited to lists of extracted entities, topics, themes concepts or the like. Interesting items in the corpus are identified based on the similarity between the corpus index items and the determined user interest information. Matches or conceptual overlaps between the corpus index items and determined user interest information indicate topics, themes or concepts contained within the corpus that are of interest to the user. Interesting item indicators are also determined. The interesting item indicators provide a user interface element such as a visual indicator of user interest in the interesting corpus index items. For example, an interesting indicator may be a numeral indicating the number of additional links that are associated with the determined interesting corpus index items. A persistent context-aware guide is then determined based on the corpus, the interesting corpus index items and the determined interesting item indicators.

The persistent context-aware guide and the document 1001 are then forwarded over the communications links 99 to the smartphone 400. However, it will be apparent that in various other exemplary embodiments, the system for persistent context-aware guides 100 may also be embedded within the smart phone 400 or other output device without departing from the spirit or scope of this invention. The document 1001 and the persistent context-aware guide are optionally rendered within the reading and the guide panes of the display of the smartphone 400. The persistent context-aware guide provides the user of the smartphone 400 with a persistent, focused and contextually relevant guide to the corpus based on user interest and the current reading context. Elements of the persistent context-aware guide are optionally selectable to navigate within the corpus.

Figure 2:
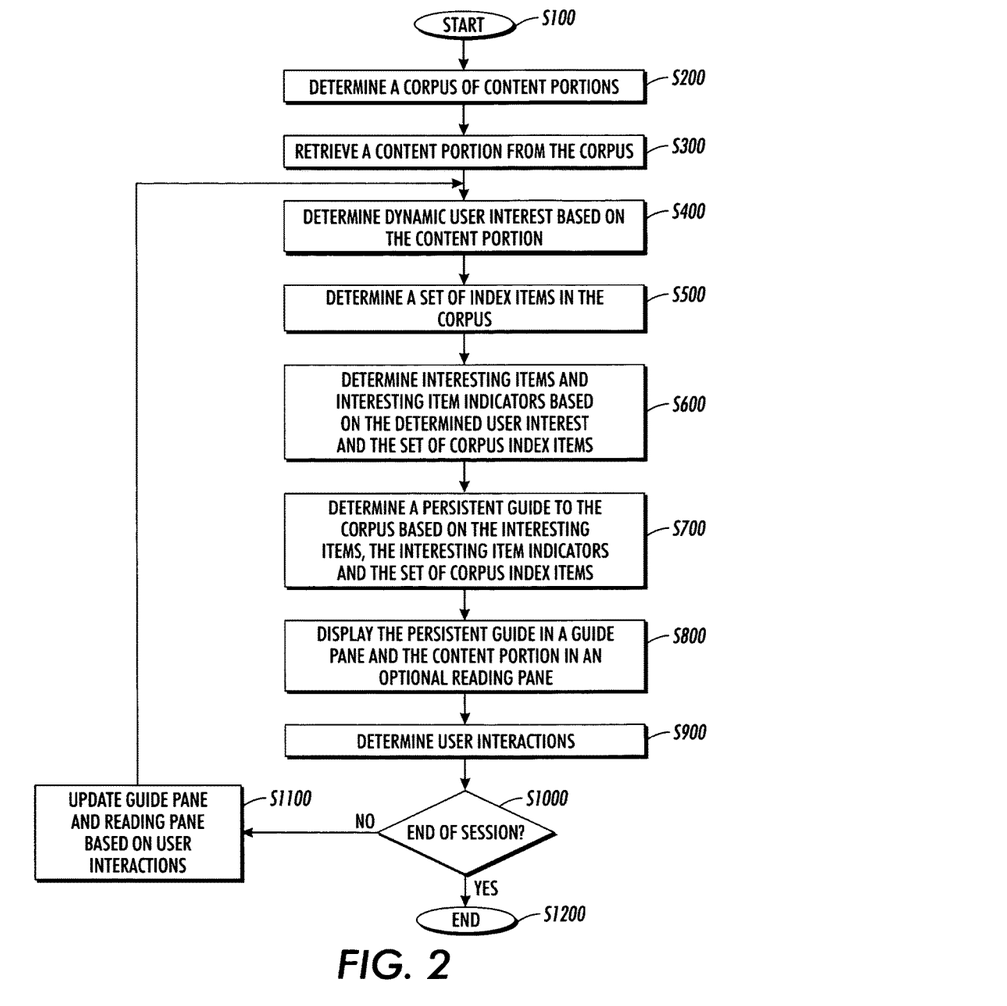
FIG. 2 shows a flowchart of an exemplary method for generating persistent context-aware guides according to an aspect of this invention.

FIG. 2 shows a flowchart of an exemplary method for generating persistent context-aware guides according to an aspect of this invention. The process begins at step S100 and immediately continues to step S200 where a corpus of content portions is determined. In various exemplary embodiments, the corpus is served by an http server, an ftp server. However, it will be apparent that the corpus may be contained within a digital library, or any other known or later developed information source without departing from the scope of this invention. After the corpus of content portions has been determined, control continues to step S300.

In step S300, a content portion is retrieved from the corpus. The content portion may be a web page or a document served by an http server or the like. In one exemplary embodiment, the content portion is a content portion or page associated with the result set returned by a user initiated query of a search engine or the like. The content portion is selected automatically under programmatic control or may be manually selected or entered by the user. After the content portion has been selected, control continues to step S400.

The dynamic user interest information is determined in step S400. The dynamic user interest information is determined by analyzing the currently visible content portion. For example, in various exemplary embodiments, topic information for the currently visible content portion is determined. The determined topics then form the dynamic user interest information. However, it will be apparent that any other known and/or later-developed methods of dynamically determining immediate user interest information based on the current content portion may also be used without departing from the spirit or scope of this invention. This dynamic determination of user interest information supports foraging. For example, a user forages by: reading a page, creating a guide to information related to the current page, selecting a new page to read from choices in the guide, returning to a previous page, returning to a previous guide. These operations constitute "Focus+Context" foraging. The "focus" is provided by the reading pane. The context is provided by the persistent context-aware guide, which provides a set of related places to go. An even tighter focus is obtained when the user selects particular information on the page by highlighting or the like. After the dynamic user interest information has been determined, control continues to step S500.

In step S500, a set of index items from the corpus are determined. The set of corpus items may be a table of contents, entities extracted from the corpus, manually or automatically generated indices and/or any other set of relevant items within the corpus. In one exemplary embodiment, multiple types and/or sources are used. Protected works, such as digital books, journals, newspapers or the like, are indexed and the indices are then made available for merging with other material. The corpus or library of protected works them becomes available for searching. Any links to these protected content portions are indicated to the user and facilitate acquisition of relevant material on demand. Thus, in some exemplary embodiments, the index items associated with protected works are indicated by a display characteristic, a symbol such as a currency symbol, words or the like. The index elements from the corpus are then lexicographically ordered. After the index elements from the corpus have been determined, control continues to step S600.

In step S600, interesting corpus items are determined based on the index items from the corpus and the dynamic user interest information determined from the current content portion. For example, in one exemplary embodiment, index items from the corpus are compared to the user interest information derived from the currently visible content portion. The degree of user-interest in an index item from the corpus and/or the degree of semantic overlap with the user interest information from the current content portion are used to determine interesting items, that is, information in the reading pane corresponding to guide elements for the page. Interesting items are indicated by interesting item indicators such as hyper-linked text, symbols or the like. In some exemplary embodiments, the interesting item indicators provide a numeric or other indicator of how much corpus information is associated with the interesting item. In other exemplary embodiments, the interesting indicators may be used to signal additional fees or costs associated with access to the protected works such as digital books, journals, articles or the like. After the interesting items have been determined, control continues to step S700.

A persistent context-aware guide to the corpus is determined in step S700. The persistent context-aware guide is based on the set of index items from the corpus, the interesting items and the interesting item indicators. After the persistent context-aware guide is determined, control continues to step S800.

In step S800 the persistent context-aware guide is displayed in a guide pane. In various exemplary embodiments, the reading pane and the guide pane are both are persistent. In still other embodiments, the reading pane and the guide pane may also have navigation controls. The joint use of the reading and guide panes supports focus+context foraging. In various embodiments, the persistent context-aware guide is based on one or more extracted entities, index items referring to the current page, entities with similar hypernyms and the like, either alone or in combination. The persistent context-aware guide provides a persistent framework that a user can employ to structure their information search and retrieval activities.

In various exemplary embodiments according to this invention, one or more of the corpus index items, extracted entities and/or other guide elements displayed in the guide pane are sponsored or advertising guide elements. The sponsored guide elements provide access to information of which a user may not be aware and which they may not have previously had access to. The user is more likely to purchase the sponsored or protected information as evidenced by their use of tools to search for similar information. In still other embodiments according to this invention, the persistent context-aware guide allows sponsored guide elements and/or advertising guide elements to be logically placed in the persistent context-aware guide based on lexicographical ordering, placed under the appropriate or correct header, hypernym or the like.

After the persistent context-aware guide is displayed, control continues to step S900 where user interactions are determined. The user interactions may include but are not limited to navigation within documents, navigation within the reading pane, navigation within the guide pane, navigation within the guide pane, and termination of the session. Control then continues to step S1000 where a determination is made as to whether an end-of-session has been entered by the user, initiated by the program or otherwise indicated. If it is determined that an end-of-session has not been determined, control continues to step S1100 where the guide pane and/or the reading pane is updated based on the user interactions. Control then jumps immediately to step S400. Steps S400-S1100 are then repeated until it is determined that the end-of-session has been signaled. Control then continues to step S1200 and the process ends.

Figure 3:
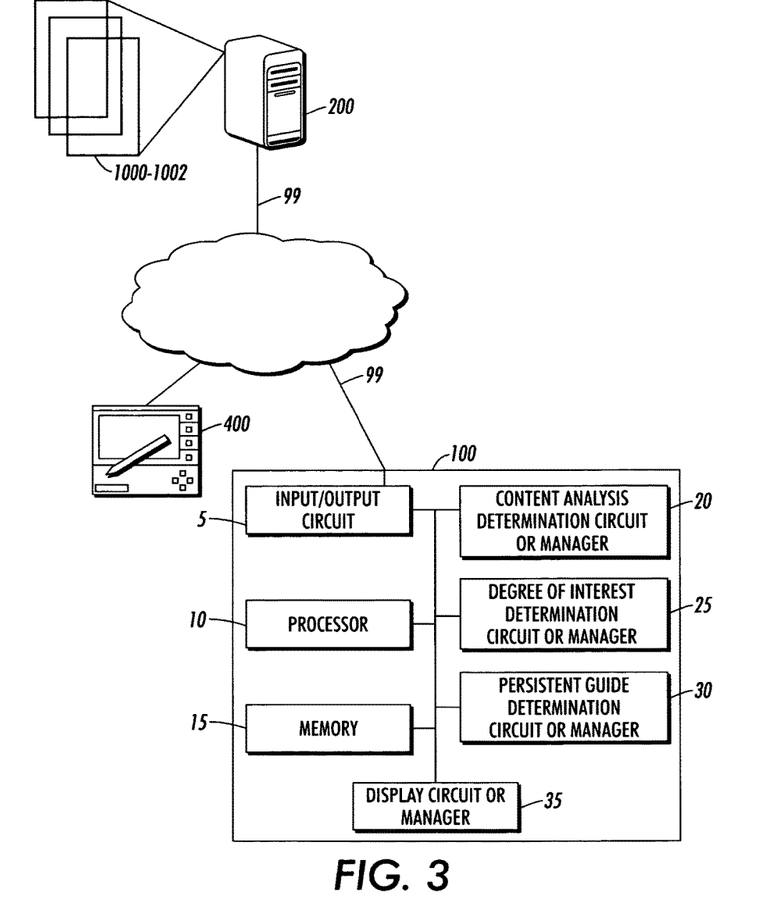
FIG. 3 is an exemplary system for persistent context-aware guides according to an aspect of this invention.

FIG. 3 is an exemplary system for persistent context-aware guides 100 according to an aspect of this invention. The system for persistent context-aware guides 100 is comprised of: a processor 10, a memory 15, a content analysis determination circuit or manager 20; a degree of interest determination circuit or manager 25; a persistent guide determination circuit or manager 30; and a display circuit or manager 35; each connected to an input/output circuit 5 and via communications links 99 to: a smartphone 400; and an information repository 200 providing access to a corpus of documents or content portions 1000-1010.

In one exemplary embodiment according to this invention, a user of the smartphone 400 requests document 1001 from the information repository 200. The request is transferred over the communications links 99 and is mediated by the system for persistent context-aware guides 100. The processor 10 of the system for persistent context-aware guides 100 activates the input/output circuit 5 to retrieve document 1001 from the information repository 200 and store the document 1001 in memory 15. The processor 10 activates the content analysis determination circuit or manager 20 to determine the dynamic user-interest information. The dynamic user interest information is based on the information under immediate review by the user. That is, the currently and/or simultaneously displayed document 1001 is analyzed to determine the current user interest. When a user navigates to a new document or content portion, the user interest information is dynamically and immediately updated based on the newly displayed document or content portion. In various other embodiments, user actions such as highlighting all or portions of a content portion, or the like can be used to indicate specific areas of user interest in the displayed document or content portion.

The processor 10 then activates the degree of interest determination circuit or manager 25. The degree of interest determination circuit or manager 25 selects from a set of index items associated with the corpus of documents that are of interest to the user. The set of corpus index items may be determined dynamically or in a prior step.

The processor 10 then activates the persistent guide determination circuit or manager 30 to select interesting corpus index items that are the same or similar to the determined dynamic user interest information. Links to the selected interesting corpus index items are displayed in the persistent context aware guide.

The processor 10 then activates the display circuit or manager 45 to display the persistent context-aware guide and/or to forward a generated and displayable persistent context-aware guide over communications links 99 for display on the smartphone 400. In various exemplary embodiments, the content portion is displayed within a reading pane and the context-aware guide is displayed within a guide pane.

Figure 4:
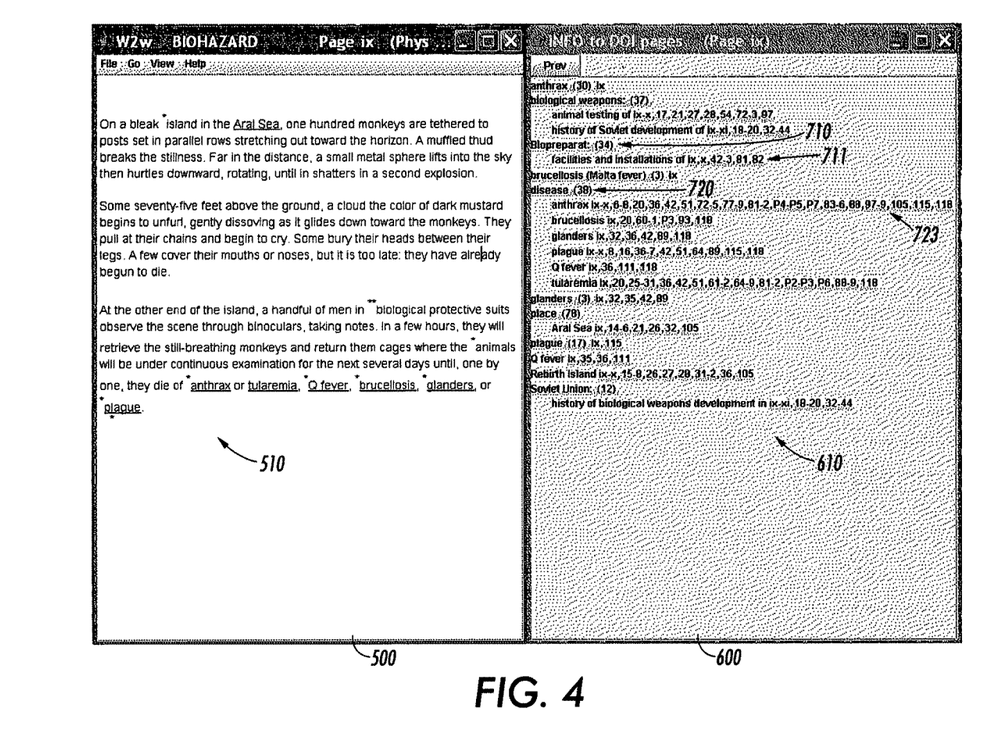
FIG. 4 shows an exemplary persistent context-aware guide displayed in a guide pane according to an aspect of this invention.

FIG. 4 shows an exemplary persistent context-aware guide 610 displayed in a guide pane 600 according to an aspect of this invention. The persistent context-aware guide 610 is comprised of an index of relevant topics. The relevant topics are associated with portions of the documents or content portions in a corpus of documents or content portions.

In one of the various exemplary embodiments according to this invention, the persistent context-aware guide is determined by selecting elements from a previously compiled index for the corpus based on terms extracted from the currently visible document or content portion. For example, the terms anthrax, tularemia, Q fever, brucellosis, glanders and plague are all explicitly mentioned in the currently visible document or content portion. Thus, concepts from the corpus index corresponding to this dynamic user interest information are selected for display within the persistent context-aware guide.

In one of the exemplary embodiments according to this invention, a hypernym for the set of extracted terms is determined and used as a topic header. For example, the term "diseases" is a hypemrnym of the terms anthrax, tularemia, Q fever, brucellosis, glanders and plague. Each of these extracted terms therefore appears below and is associated with the topic header "diseases" as an extracted topic entry 720 in the context-aware guide 610.

Each disease also appears as a separate link in the persistent context-aware guide 610. The persistent context-aware guide 610 is dynamically computed and/or generated when the user hits a key, enters a command or the like.

Figure 5:
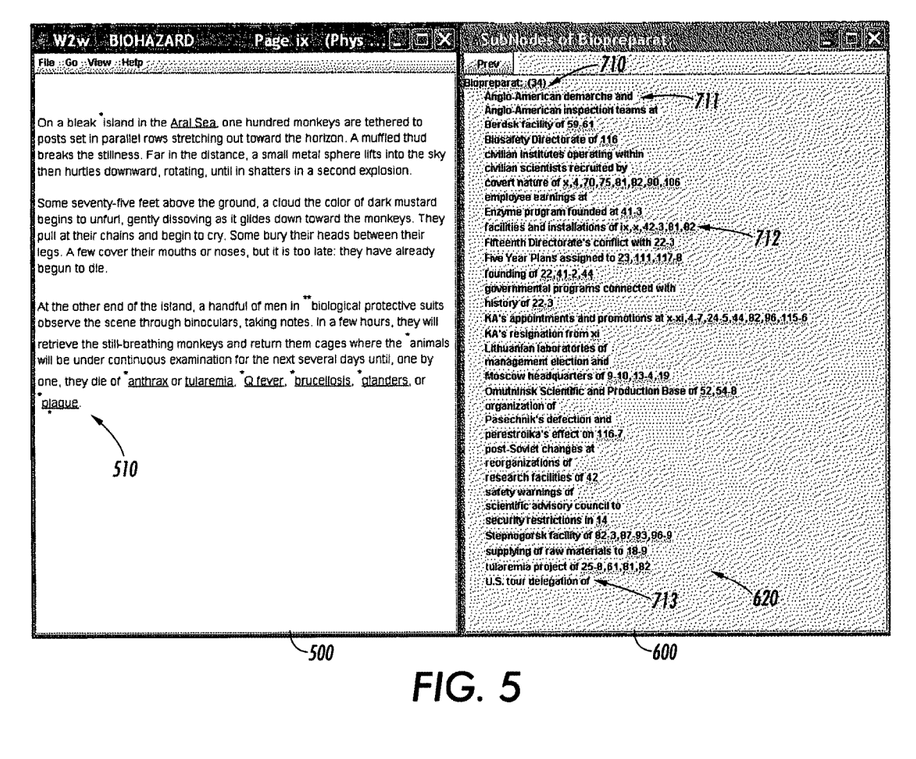
FIG. 5 shows a second exemplary persistent context-aware guide displayed in a guide pane according to an aspect of this invention.

FIG. 5 shows a second exemplary persistent context-aware guide 620 displayed in a guide pane 600 according to an aspect of this invention. When the user selects the topic "Biopreparat" 710 from the persistent context aware guide displayed within the guide pane 600, the entries related to "Biopreparat" are expanded. This expansion allows a user to review other potentially relevant links while maintaining context within the current document or content portion. The information can be expanded, compressed or otherwise transformed. In various embodiments, gestures, or indications of user interest or focus are used to make other adjustments to the quantity of displayed information while maintaining context with respect to the information displayed within the reading pane 500 and the guide pane 600.

The first sub-topic index entry beneath the "Biopreparat" 710 corpus index entry is "Anglo-American demarche and" 711. The "Anglo-American demarche" corpus index entry is not directly mentioned within the content portion 510. However, the sub-topic corpus index entry is included in the expanded topic displayed in the guide pane since the user selection of the "Biopreparat" 710 corpus index entry implies user interest in all sub-topic corpus index entries related to the "Biopreparat" 710 corpus index entry.

The tenth sub-topic beneath the "Biopreparat" 710 corpus index entry is "facilities and installations of ix-x, 42-3, 81, 82". This sub-topic corpus index entry was displayed in the previous persistent context-aware guide since it matches the currently visible document or content portion. That is, the currently visible document describes a bleak island in the Aral Sea which was in fact one of the "Biopreparat" facilities. It should be noted that neither the term "Biopreparat" nor the term "facilities" are found in the currently visible document or content portion. Thus, it should also be apparent that automatic and/or manually created indices may be used without departing from the scope of this invention.

The thirty-fourth corpus index entry 713 contains the value "U.S. tour delegation of". This corpus index entry is displayed when the "Biopreparat" corpus index entry 710 was expanded. However, the thirty-fourth corpus index entry 713 was not visible in the previously described persistent context-aware guide since the corpus index entry did not match any of the elements from the currently visible document or content portion.

Figure 6:
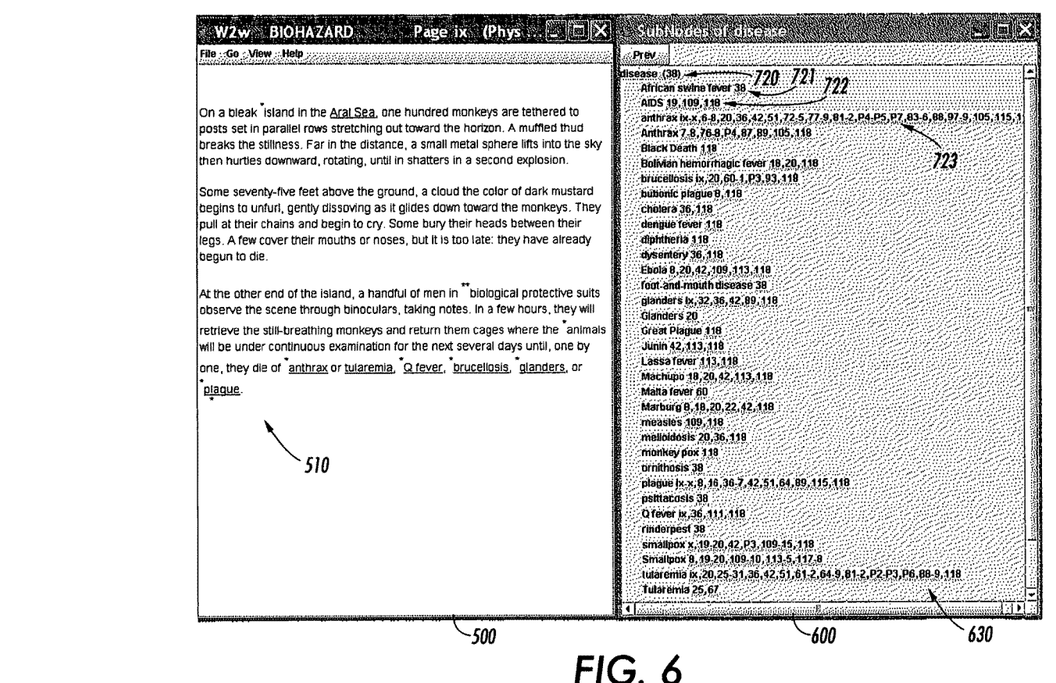
FIG. 6 shows a third exemplary persistent context-aware guide displayed within a guide pane according to an aspect of this invention.

FIG. 6 shows a third exemplary persistent context-aware guide 630 displayed within a guide pane 600 according to an aspect of this invention. The persistent context-aware guide 630 shows the expansions that occur when the user expands the corpus index entry "diseases". The resulting persistent context-aware guide 630 enumerates links to each of the diseases mentioned within the corpus. That is, each disease identified in the content portion and having a corresponding corpus index entry is listed in the persistent context aware guide 630 displayed in the guide pane 600.

The first row of the persistent context-aware guide contains the value "diseases (38)". This indicates that there are 38 entries within the "diseases" topic. The second row contains the value "African Swine Fever 38". The user displays the content portion associated with the "African Swine Fever" corpus index entry by selecting the link in the persistent context-aware guide 630 displayed in the guide pane 600. The reading pane is then updated from the currently displayed page ix to page 38.

The third row contains the value "AIDS, 19, 109, 110" 722. In one exemplary embodiment, selecting the page numbers of the "AIDS" corpus index entry in the guide pane 600 displays the relevant page within the reading pane 500. The persistent context-aware guide 630 maintains the users focus and context during information foraging activities.

The fourth row contains the values "anthrax, ix-x, 6-8, 20, 36, 42, 51, 72-5, 77-9, 81-2, p4-p5, p7, 83-6, 88, 97-9, 105, 115" 723. These corpus index entries indicate documents or content portions in the corpus identified as relevant to the term "anthrax". The fifth row contains the value "Anthrax 7-8, 76-8, p-4, 87, 89, 105, 118. These corpus index entries are manually generated and indicate document or content portions in the corpus relevant to the term "anthrax". The capitalization of the "Anthrax" term allows the user to differentiate between multiple sources of index information. In still other exemplary embodiments, additional display characteristics such as color, underlining, font size or the like may also be used to signal origination of the entry in different index sources. For example, in another embodiment, paid placement or advertising material is indicated by differentiating display characteristics such as capitalization, highlighting, fonts, color, underlining or the like. In still other exemplary embodiments, information from multiple sources is integrated or fused into a single corpus index entry.

Figure 7:
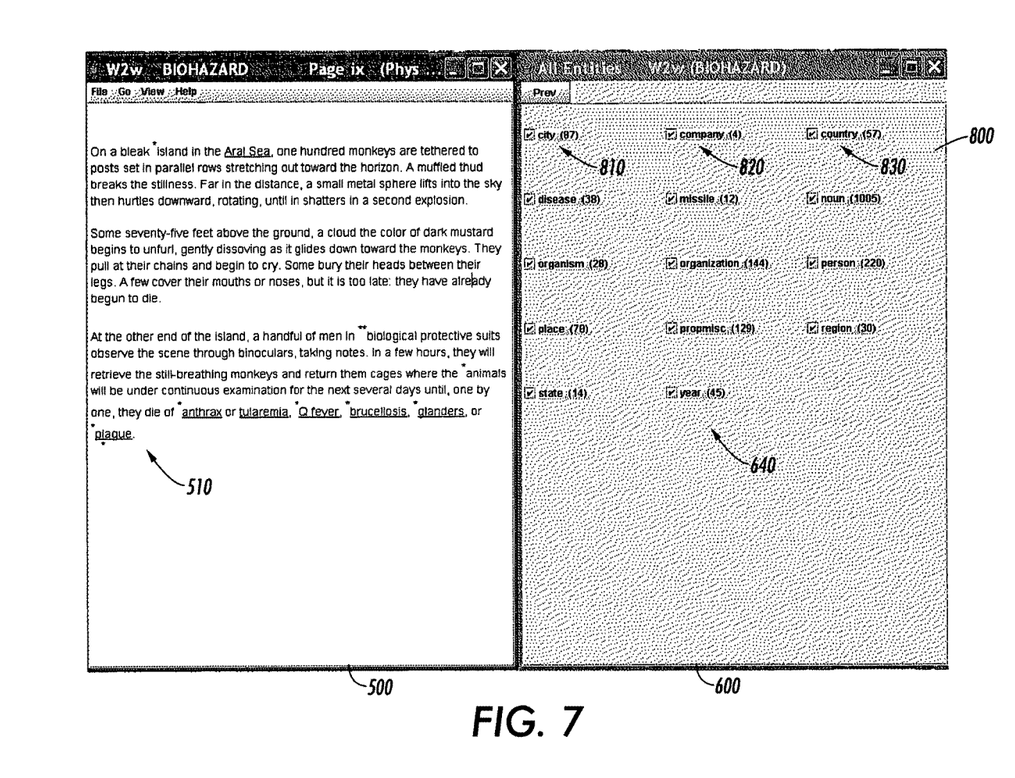
FIG. 7 shows a fourth exemplary persistent context-aware guide according to an aspect of this invention.

FIG. 7 shows a fourth exemplary persistent context-aware guide 640 according to an aspect of this invention. The persistent context-aware guide 640 uses a list of entities 800 to be extracted from the documents or content portions in the corpus. The entities may include, but are not limited to years, people, company and/or other known or later specified named or extracted entity.

In one exemplary embodiment according to this invention, the user finds all references in a set of documents or content portions that reference various types of companies by selecting the "company" type of named entity. This facilitates information foraging and/or browsing activities.

Figure 8:
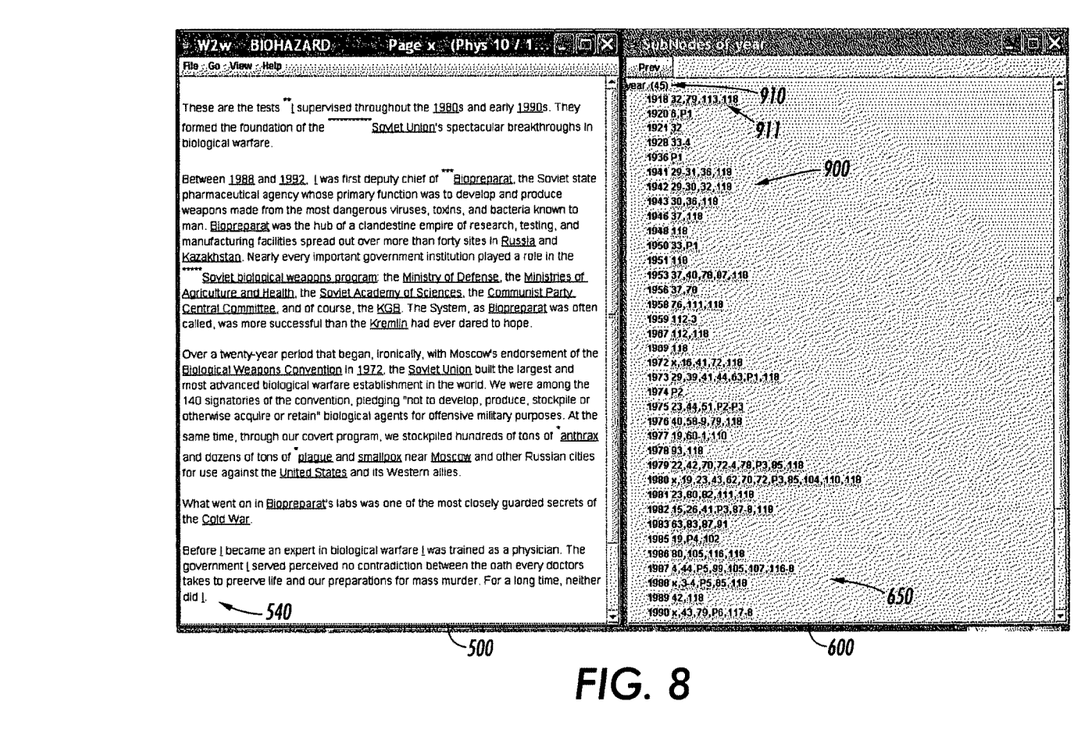
FIG. 8 shows a fifth exemplary persistent context-aware guide according to an aspect of this invention.

FIG. 8 shows a fifth exemplary persistent context-aware guide 650 according to an aspect of this invention. The persistent context-aware guide 650 shows an expanded list of "YEAR" type index entries 910 extracted from the one or more documents or content portions of the corpus. An associated content portion 540 is displayed when the page number 911 associated with the relevant year entry is selected.

FIG. 9 shows a sixth exemplary persistent context-aware guide 660 according to an aspect of this invention. The user further focuses the user interest information by highlighting a portion of the document or content portion 530 displayed in the reading pane 500. The elements contained within the selected portion 531 are used to create a persistent context-aware guide 660. The persistent context-aware guide 660 provides a set of guide elements. The guide elements are index entries, links or connections to other places within the corpus of documents or content portions containing material relevant to the selected portion 531. In various embodiments, the persistent context-aware guide 660 includes corpus items from multiple sources. For example, index entries from a manually generated index may be combined with a list of index entities automatically extracted from the corpus, paid placement and/or advertising material and other sources of indices. The combined list of index entries is lexicographically ordered and/or merged and displayed as guide elements that facilitate browsing.

Figure 10:
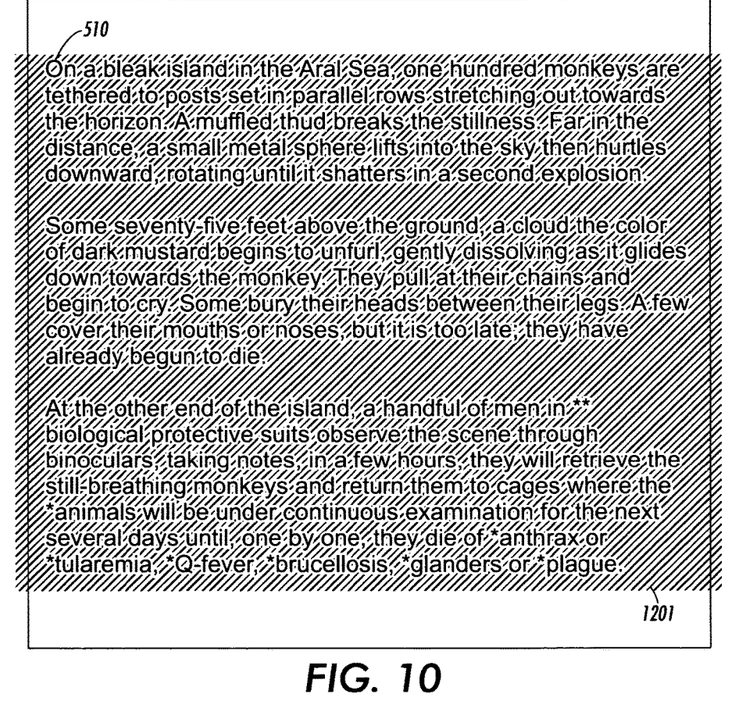
FIG. 10 is a first exemplary content portion according to an aspect of this invention.

FIG. 10 is a first exemplary content portion 510 according to an aspect of this invention. The entire portion highlighted portion 1201 of the content portion 510 is used to dynamically determine the current user interest information. That is, the items identified in the content portion are used to dynamically determine the information of interest to the user. The items may include topics, sentences, words and/or other semantic structures within the content portion 510.

Figure 11:
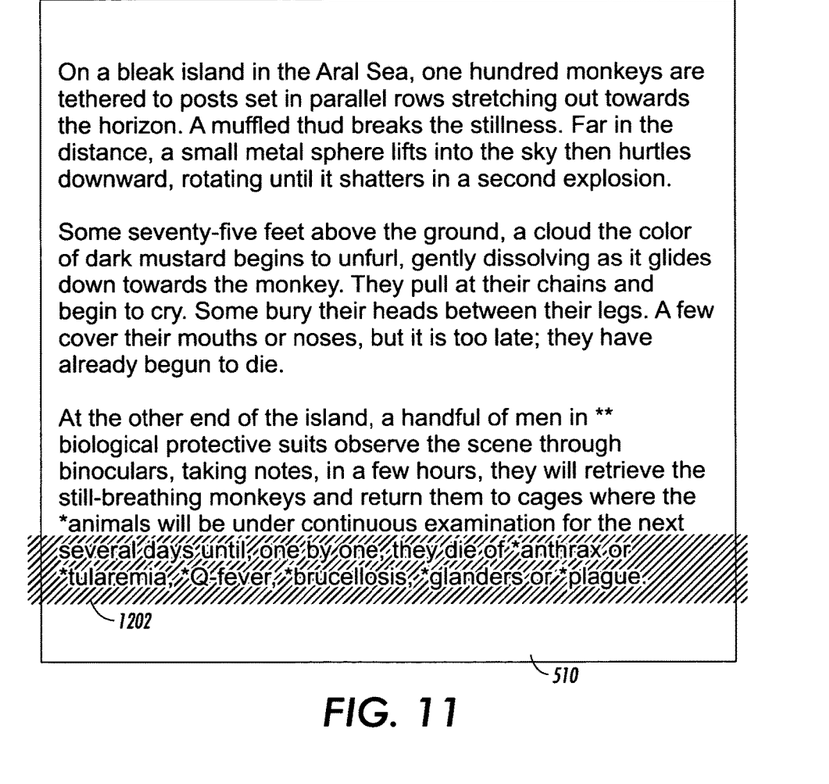
FIG. 11 is a second exemplary content portion according to an aspect of this invention.

FIG. 11 is a second exemplary content portion 510 according to an aspect of this invention. A sub-portion 1202 of the content portion 510 is used to dynamically determine information of interest to the user. In various exemplary embodiments, items identified in the sub-portion 1202 of the content portion 510 are used to determine and/or further dynamically refine the user interest information. The items may be topics, sentences, words and/or other semantic units within the content portion 510.

In various embodiments, various types of marking or notation are used to designate index terms. For example, index terms may also be extracted or selected from an index for use as guide elements without departing from the scope of this invention.

The persistent context-aware guide provides a view of the information content of the corpus personalized to the user's current location within the document or content portion. In various exemplary embodiments according to this invention, the index items in the corpus include topics, themes, keywords or the like.

In the various embodiments of the system for persistent context-aware guides 100, each of the circuits 5-35 outlined above can be implemented as portions of a suitably programmed general-purpose computer. Alternatively, 5-35 of the system for persistent context-aware guides 100 outlined above can be implemented as physically distinct hardware circuits within an ASIC, or using a FPGA, a PDL, a PLA or a PAL, or using discrete logic elements or discrete circuit elements. The particular form each of the circuits 10-35 of the system for persistent context-aware guides 100 outlined above will take is a design choice and will be obvious and predictable to those skilled in the art.

Moreover, the system for persistent context-aware guides 100 and/or each of the various circuits discussed above can each be implemented as software routines, managers or objects executing on a programmed general purpose computer, a special purpose computer, a microprocessor or the like. In this case, the system for persistent context-aware guides 100 and/or each of the various circuits discussed above can each be implemented as one or more routines embedded in the communications network, as a resource residing on a server, or the like. The system for system for persistent context-aware guides 100 and the various circuits discussed above can also be implemented by physically incorporating the system for persistent context-aware guides 100 into software and/or hardware system, such as the hardware and software systems of a web server or a client device.

As shown in FIG. 3, memory 15 can be implemented using any appropriate combination of alterable, volatile or non-volatile memory or non-alterable, or fixed memory. The alterable memory, whether volatile or non-volatile, can be implemented using any one or more of static or dynamic RAM, a floppy disk and disk drive, a write-able or rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 99 shown in FIGS. 1 & 3, can each be any known or later developed device or system for connecting a communication device to the system for persistent context-aware guides 100, including a direct cable connection, a connection over a wide area network or a local area network, a connection over an intranet, a connection over the Internet, or a connection over any other distributed processing network or system. In general, the communication links 99 can be any known or later developed connection system or structure usable to connect devices and facilitate communication.

Further, it should be appreciated that the communication links 99 can be wired or wireless links to a network. The network can be a local area network, a wide area network, an intranet, the Internet, or any other distributed processing and storage network.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for creating and using context-aware guides comprising:
    displaying, by a computer, a visible content portion from a corpus in a reading pane to a user;
    deriving, by the computer, user interest information from the visible content portion;
    determining, by the computer, a set of index items based on the corpus by combining a manually generated index with a list of entities extracted from the corpus, paid placement or advertising material, and protected works which are indexed, to obtain a combined list;
    lexographically ordering and merging items in the combined list;
    determining, by the computer, a set of user interface guide elements for the corpus that correspond to information items from a content portion that includes the visible content portion, wherein the information items from the content portion include annotations indicated by subscripts and are determined using the extracted entities, and wherein the user interface guide elements are based on the combined list;
    determining, by the computer based on a degree of semantic overlap, an item of interest by comparing a determined index item to the derived user interest information,
    wherein the item of interest comprises information in the reading pane which corresponds to a user interface guide element;
    displaying, for a respective information item, an indicator in the reading pane indicating additional costs for accessing associated reference items;
    displaying the user interface guide elements and corresponding interesting item indicators as a context-aware guide in a guide pane,
    wherein a respective interesting item indicator provides an indicator of how much corpus information is associated with the determined item of interest and further provides fees or costs associated with access to the protected works,
    wherein access to a displayed user interface guide element is purchased by selecting the displayed user interface guide element in the context-aware guide,
    wherein the user interacts with the displayed user interface guide elements to purchase access to a single page of a work, a section of a work, a chapter, an entire work, and a collection of works, and wherein a plurality of pages, including at least one recently-visited page and at least one page immediately linked-to by the current page, are used to provide context for creating the context-aware guide;

in response to receiving a request via a displayed user interface guide element to expand the item of interest, updating the context-aware guide displayed in the guide pane to display a new set of user interface guide elements associated with and displayed as sub-entries of the item of interest, wherein at least one user interface guide element of the new set of user interface guide elements is not displayed in the visible content portion in the reading pane; and responsive to a user navigating to a new document or a new visible content portion, dynamically updating the displayed reading pane and the displayed user interface guide elements in the guide pane based on the user's current location within the new document or the new visible content portion.

2. The method of claim 1, wherein the corpus comprises at least one of:
pages of a book, web pages, works in a digital library, and works in an information feed.

3. The method of claim 1, wherein the information items are further determined using topic identification.

4. The method of claim 1, wherein the set of user interface guide elements for the corpus comprises elements from one or more of: a table of contents, an index, a manually produced index, an automatically produced index, an ontology of extracted entities, and an ontology of topics.

5. The method of claim 1, wherein determining, the item of interest is further based on a degree of interest, and wherein the degree of interest is based on term-matching.

6. The method of claim 5, wherein the user interface guide elements include the item of interest and one or more other items of interest, and
wherein displaying the user interface guide elements as the context-aware guide is based on a highest degree of interest associated with the item of interest and the other items of interest.

7. The method of claim 1, wherein the set of user interface guide elements for the corpus are derived from at least two sources.

8. The method of claim 1, wherein the context-aware guide is organized as at least one of: a topic map, an index, a tree, and lexicographically ordered sources.

9. The method of claim 1, wherein the annotations indicate referents of items from the corpus.

10. The method of claim 9, wherein the annotations are further indicated by a display characteristic.

11. The method of claim 10, wherein the display characteristic is at least one of: highlights, font effects, subscripts, and superscripts.

12. The method of claim 9, wherein the annotations are selectable and operable to select associated guide elements for display.

13. The method of claim 9, wherein reading pane interactions change the displayed context-aware guide.

14. The method of claim 1, wherein the reading pane contains a set of navigation controls.

15. The method of claim 14, wherein the navigation controls include at least one of: forward and back navigation controls.

16. The method of claim 1, wherein the guide pane includes selectable guide elements indicative of relevant corpus items, which are outside the context of the reading pane.

17. The method of claim 16, wherein the selectable guide elements are operable to adjust the scope of the guide.

18. The method of claim 1, wherein displayed user interface guide elements which are associated with protected content portions are associated with a cost indicator.

19. The method of claim 18, wherein the cost indicator is at least one of: a token, a symbol, a word, and a display characteristic.

20. The method of claim 1, wherein the several pages further include at least one of: adjacent pages in a book, a set of pages that are reached by a short path from the current page, and a set of pages on the same web site as the current page.

21. The method of claim 1, wherein the context-aware guide indicates which pages in the user interface guide elements were previously visited by the user.

22. A system for providing context-aware guides, comprising:
a processor;
an input/output manager configured to display a visible content portion from a corpus in a reading pane to a user;
a content analysis determination manager configured to derive user interest information from the visible content portion;
a degree of interest determination manager configured to:
determine a set of index items based on the corpus by combining a manually generated index with a list of entities extracted from the corpus, paid placement or advertising material, and protected works which are indexed, to obtain a combined list;
lexographically order and merge items in the combined list; and
determine a set of user interface guide elements for the corpus that correspond to information items from a content portion that includes the visible content portion, wherein the information items from the content portion include annotations indicated by subscripts and are determined using the extracted entities, and wherein the user interface guide elements are based on the combined list;
a persistent guide determination manager configured to determine, based on a degree of semantic overlap, an item of interest by comparing a determined index item to the derived user interest information,
wherein the item of interest comprises information in the reading pane which corresponds to a user interface guide element; and
a display manager configured to:
display, for a respective information item, an indicator in the reading pane indicating additional costs for accessing associated reference items;
display the user interface guide elements and corresponding interesting item indicators as a context-aware guide in a guide pane,
wherein a respective interesting item indicator provides an indicator of how much corpus information is associated with the determined item of interest and further provides fees or costs associated with access to the protected works,
wherein access to a displayed user interface guide element is purchased by selecting the displayed user interface guide element in the context-aware guide,
wherein the user interacts with the displayed user interface guide elements to purchase access to a single page of a work, a section of a work, a chapter, an entire work, and a collection of works, and wherein a plurality of pages, including at least one recently-visited page and at least one page immediately linked-to by the current page, are used to provide context for creating the context-aware guide;

in response to receiving a request via a displayed user interface guide element to expand the item of interest, update the context aware guide displayed in the guide pane to display a new set of user interface guide elements associated with and displayed as sub-entries of the item of interest, wherein at least one user interface guide element of the new set of user interface guide elements is not displayed in the visible content portion in the reading pane; and responsive to a user navigating to a new document or a new visible content portion, dynamically update the displayed reading pane and the displayed user interface guide elements in the guide pane based on the user's current location within the new document or the new visible content portion.

23. A non-transitory computer readable storage medium embedded with instructions that when executed by a computer cause the computer to perform a method, the method comprising:

displaying, by the computer, a visible content portion from a corpus in a reading pane to a user;

deriving, by the computer, user interest information from the visible content portion;

determining, by the computer, a set of index items based on the corpus by combining a manually generated index with a list of entities extracted from the corpus, paid placement or advertising material, and protected works which are indexed, to obtain a combined list;

lexographically ordering and merging items in the combined list;

determining, by the computer a set of user interface guide elements for the corpus that correspond to information items from a content portion that includes the visible content portion, wherein the information items from the content portion include annotations indicated by subscripts and are determined using the extracted entities, and wherein the user interface guide elements are based on the combined list;

determining, by the computer based on a degree of semantic overlap, an item of interest by comparing a determined index item to the derived user interest information, wherein the item of interest comprises information in the reading pane which corresponds to a user interface guide element;

displaying, for a respective information item, an indicator in the reading pane indicating additional costs for accessing associated reference items;

displaying the user interface guide elements and corresponding interesting item indicators as a context-aware guide in a guide pane, wherein a respective interesting item indicator provides an indicator of how much corpus information is associated with the determined item of interest and further provides fees or costs associated with access to the protected works, wherein access to a displayed user interface guide element is purchased by selecting the displayed user interface guide element in the context-aware guide, wherein the user interacts with the displayed user interface guide elements to purchase access to a single page of a work, a section of a work, a chapter, an entire work, and a collection of works, and wherein a plurality of pages, including at least one recently-visited page and at least one page immediately linked-to by the current page, are used to provide context for creating the context-aware guide;

in response to receiving a request via a displayed user interface guide element to expand the item of interest, updating the context-aware guide displayed in the guide pane to display a new set of user interface guide elements associated with and displayed as sub-entries of the item of interest, wherein at least one user interface guide element of the new set of user interface guide elements is not displayed in the visible content portion in the reading pane; and responsive to a user navigating to a new document or a new visible content portion, dynamically updating the displayed reading pane and the displayed user interface guide elements in the guide pane based on the user's current location within the new document or the new visible content portion.

* * * * *